April 23, 1968 R. J. KASPER 3,379,962
METHOD OF BALANCING A THREE-PHASE SYSTEM FOR
AN INDUCTION HEATING INSTALLATION
Filed Sept. 20, 1965

*INVENTOR.*
ROBERT J. KASPER
BY
*Tilberry & Body*

ATTORNEYS

United States Patent Office 3,379,962
Patented Apr. 23, 1968

3,379,962
METHOD OF BALANCING A THREE-PHASE SYSTEM FOR AN INDUCTION HEATING INSTALLATION
Robert J. Kasper, Seven Hills, Ohio, assignor to Park-Ohio Industries, Inc., a corporation of Ohio
Filed Sept. 20, 1965, Ser. No. 488,500
4 Claims. (Cl. 323—128)

The present invention pertains to the art of induction heating and, more particularly, to a method of balancing a three phase electrical system for energizing an induction heating installation.

The present invention is particularly applicable to a method of balancing a three phase electrical system for energizing an induction heating installation, such as two induction melting furnaces connected directly onto the three phase power lines with one phase of the system being unloaded, and it will be described with particular reference thereto; however, it will be appreciated that this invention has much broader applications and may be used by various other induction heating installations having two units so that one phase of the three phase electrical system is unloaded.

In many induction heating installations, each heating station, be it a melting furnace or a similar device, is connected directly, or by a transformer, across one phase of the commercial three phase system supplied to the installation. When three separate inductions heating stations or units are used, one station may be connected across each phase, and, by appropriate power factor correcting capacitors, each separate station or phase can be balanced. In this manner, the complete three phase system is balanced. Three stations or units are not always available in an induction heating installation. In some heating installations, only two heating stations or units are to be connected across the three phase power lines. This leaves one phase of the three phase power supply system unloaded. In such a case, even if each of the induction heating stations is balanced, the three phase system will be unbalanced. This unbalance causes an unsymmetric condition in the three phase power system which causes high electrical losses within the system and high voltage drops along the power lines. Unsymmetrical loading of the system also substantially reduces the overall efficiency of the induction heating installation. Moreover, the unbalance in the system distorts the voltage triangle of the system and impairs the operation of other electrical components, such as motors and transformers, connected across the same system. These disadvantages caused by the induction heating stations being connected across only two phases of the three phase system are only representative of numerous other electrical difficulties encountered. Consequently, power companies often limit the amount of power which can be consumed in two single phase loads connected onto a three phase system. In addition, power companies quite often charge a premium for operating an unbalanced three phase power system because of the low efficiency and other difficulties encountered when such unbalance is experienced.

The present invention is directed toward a method of balancing a three phase electrical system wherein one phase of the system is unloaded.

In accordance with the invention, the reactance in the two loaded phases of the system is adjusted so that each phase is not individually balanced, i.e., the power factor in each loaded phase is not 1.0. To the contrary, the reactances in the loaded phases are adjusted so that the currents in the two loaded phases are displaced from each other by approximately 60°. In a manner to be hereinafter described, this adjustment of the reactances within the loaded phases of the three phase system will result in an overall balance of all line currents within the three phase system, even though one phase of the system is completely unloaded. The concept of operating the separate phases without a power factor corrected to unity is foreign to all principles of induction heating.

The method contemplated by the present invention can be conveniently practiced by adjusting the power factor correcting capacitors conventionally provided with the individual heating stations. For instance, the power factor adjusting capacitor of one phase may be adjusted so that the current within that phase leads by 30°. At the same time, the current in the other induction heating station is caused by a similar, but opposite, adjustment to lag by 30°. This results in the desired 60° displacement of the currents within the loaded phases of the electrical system. In the past, the currents in these separate phases have been displaced by approximately 120°. This convenient manner of adjusting the capacitive reactance in the two loaded phases of the system in essence requires no added components to the individual heating stations; therefore, the present method is economical in practice.

The primary object of the present invention is the provision of a method of balancing a three phase delta electrical system used for energizing two induction heating stations wherein one phase is unloaded.

Another object of the present invention is the provision of a method of balancing a three phase delta electrical system used for energizing two induction heating stations wherein one phase is unloaded which method can be performed with the electrical components usually provided with the induction heating stations.

Still another object of the present invention is the provision of a method of balancing a three phase delta electrical system used for energizing two induction heating stations wherein one phase is unloaded which method involves changing the reactance of the two heating stations to adjust the angle of the single phase current in each of the loaded phases so that these currents are displaced from each other by approximately 60°.

Yet another object of the present invention is the provision of a method of balancing a three phase delta electrical system used for energizing two induction heating stations wherein one phase is unloaded which method involves increasing the power factor correcting capacitors in one station and decreasing the power factor correcting capacitors in the other station so that the single phase currents in the respective stations are displaced from each other by approximately 60°.

Another object of the present invention is the provision of a method of balancing a three phase delta electrical system used for energizing two induction heating stations wherein one phase is unloaded which method involves over-correcting the power factor of one of the stations and under-correcting the power factor in the other station so that the single phase currents in these stations are displaced from each oher by approximately 60°.

These and other objects and advantages will become apparent from the following description used to illustrate the preferred embodiment of the invention as read in connection with the accompanying drawing in which.

Figure 1:
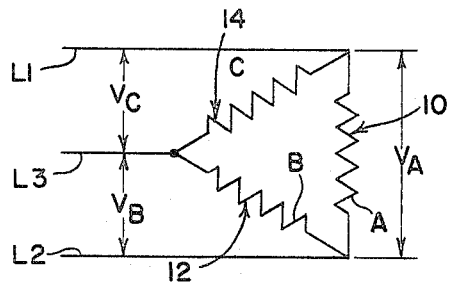
FIGURE 1 is a wiring diagram illustrating, somewhat schematically, the art to which the present invention is directed.

Referring now to the drawing wherein the showings are for the purpose of illustrating a preferred embodiment of the invention only and not for the purpose of limiting same, FIGURE 1 shows a somewhat standard wiring diagram for energizing induction heating stations 10, 12, and 14 by a three phase delta electrical system having lead-in lines L1, L2 and L3. For the purpose of discussion, it can be assumed that the power factor of each heating station 10, 12, and 14 is approximately 1.0; therefore, the three phases A, B and C are electrically equivalent to only resistance loads and are represented as resistors. It is appreciated that the induction heating stations or units may be melting furnaces or the like and that they exhibit inherent inductive reactances. It is common knowledge in the induction heating art that capacitive reactance, i.e. capacitors, can be connected in parallel with the heating stations to correct the power factor to approximately 1.0. The particular arrangements for accomplishing this adjustment are commonly known in the art.

Figure 2:
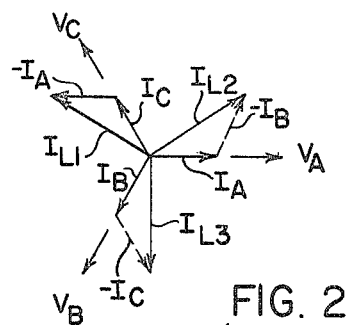
FIGURE 2 is a vector diagram representing the voltages and currents of the wiring diagram shown in FIGURE 1.

Referring now to FIGURE 2, the voltages and currents of the wiring diagram shown in FIGURE 1 are vectorially represented. $V_A$, $V_B$ and $V_C$ are the voltages in the three phases A, B, and C. Currents $I_A$, $I_B$ and $I_C$ are the currents flowing through the individual stations 10, 12 and 14, respectively. The currents $I_{L1}$, $I_{L2}$ and $I_{L3}$ are the currents flowing within the lead-in lines L1, L2 and L3, respectively. Assuming that the melting furnaces forming the heating stations 10, 12 and 14 are identical and have a power factor of 1.0, the currents flowing in the lead-in network, i.e., $I_{L1}$, $I_{L2}$ and $I_{L3}$ are equal and are displaced from each other 120°. These conditions are essential to a complete balance of the three phase delta system shown in FIGURE 1. There is relatively little difficulty in accomplishing a balanced system as shown in FIGURE 2 when all three phases of the delta system shown in FIGURE 1 are loaded with melting furnaces, or other similar induction heating apparatus. In many instances, however, one phase of the delta electrical system may be unloaded. This may be caused by one of the stations being shut down or by only two stations being utilized for induction heating. In addition, it is conceivable that two phases of the three phase system may be utilized for one melting furnace which would leave the third phase unloaded. Irrespective of the reason why one phase of the three phase system is unloaded, the unloading of the phase causes an unbalance within the three phase network or system including lines L1, L2 and L3.

Figure 3:
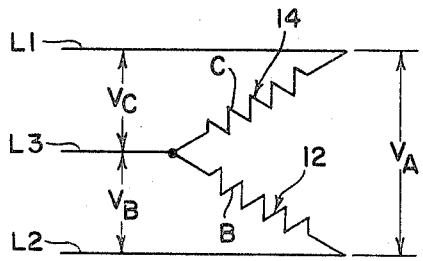
FIGURE 3 is a wiring diagram illustrating, somewhat schematically, a three phase delta electrical system with one phase unloaded.

FIGURE 3 represents a three phase delta system wherein phase A is unloaded. It is appreciated that the following descriptions would apply equally if any one of the other three phases were unloaded; however, for simplicity, phase A is shown as the unloaded phase. The unsymmetric or unbalanced condition of the system shown in FIGURE 3 is readily noticeable by consideration of the vector diagram shown in FIGURE 4. Again, it is assumed that the induction heating stations 12, 14 are each individually adjusted so that the power factor of these stations is approximately 1.0.

Figure 4:
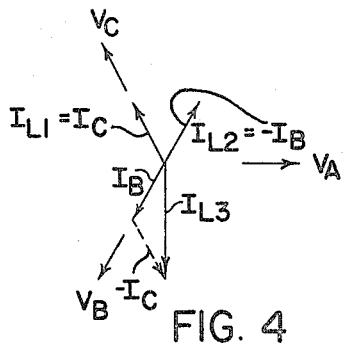
FIGURE 4 is a vector diagram representing the voltages and currents of the wiring diagram shown in FIGURE 3.

Referring now more particularly to FIGURE 4, the voltages $V_A$, $V_B$ and $V_C$ are substantially identical to these same voltages in FIGURE 2; however, the currents within the system are substantially distorted. The current $I_{L1}$ is the vector summation of $I_C$ and $-I_A$. Since no current flows in phase A, the current $I_{L1}$ equals $I_C$, and, since the power factor in phase C is 1.0, the current $I_{L1}$ coincides vectorially with the voltage $V_C$. The current $I_{L3}$ is the vector summation of currents $I_B$ and $-I_C$. Because of the power factor correction in phase B, $I_B$ vectorially corresponds with $V_B$. This provides a high current $I_{L3}$ as shown in FIGURE 4.

$I_{L2}$ is the vector summation of currents $I_A$ and $-I_B$. Since $I_A$ is zero, $I_{L2}$ equals $-I_B$. All of these values are clearly represented in FIGURE 4. It is noted that the currents $I_{L1}$ and $I_{L2}$ are substantially less than the current $I_{L3}$, and the line currents are not displaced 120° with respect to each other. For this reason, there is a substantial unbalance within the electrical network comprising lead-in lines L1, L2, and L3.

The present invention is directed toward a method for correcting this unbalanced condition so that the various currents within the lead-in lines are substantially equal and are displaced from each other by approximately 120°.

Figure 5:
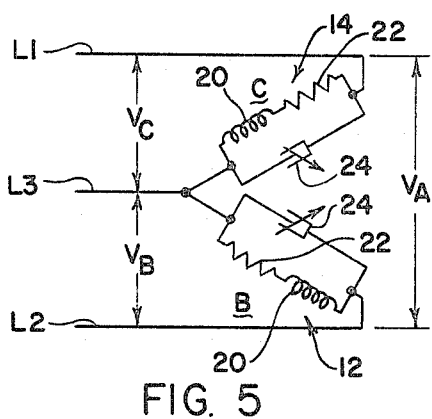
FIGURE 5 is a wiring diagram showing, somewhat schematically, the preferred embodiment of the present invention; and, FIGURE 6 is a vector diagram representing the voltages and currents of the wiring diagram shown in FIGURE 5.

Referring now to FIGURE 5, there is shown a wiring diagram similar to the wiring diagram of FIGURE 3 with phase A of the delta system being unloaded. The induction heating stations 12, 14 are shown as equivalent circuits including inductive reactance 20, resistance 22, and adjustable power factor correcting capacitive reactance 24. It is common knowledge that the reactance 24 may be adjusted so that the power factor of phases B and C is 1.0. With this arrangement, the vector diagram of FIGURE 4 is obtained.

Figure 6:
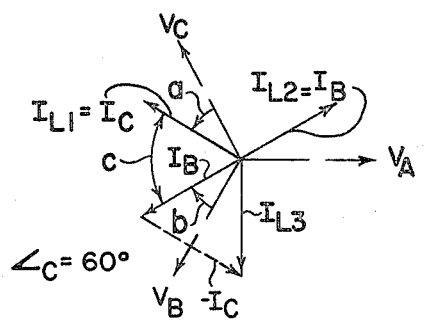

In accordance with the present invention, the capacitive reactances 24 are adjusted in phases B and C so that the power factor is not 1.0. Referring now to FIGURE 6, the capacitive reactance 24 in phase B is adjusted so that the current $I_B$ lags voltage $V_B$ by approximately 30°. This is accomplished by under-correcting the power factor in phase B. In other words, the capacitive reactance is below that which would provide a power factor of 1.0. At the same time, the capacitive reactance 24 in phase C is adjusted to a value more than that required to produce a power factor of 1.0. More specifically, the capacitive reactance is adjusted so that the current $I_C$ leads the voltage $V_C$ by approximately 30°. In this manner, the lead angle $a$ and the lag angle $b$ of the currents in the loaded phases is 60°. This results in an angle $c$ between the currents $I_B$ and $I_C$ which angle is approximately 60°. In this manner, the vector diagram for obtaining the value of current $I_{L3}$ is an equilateral triangle. This is an important aspect of the present invention. By having an equilateral triangle vectorial addition of currents $I_B$ and $-I_C$ results in a current $I_{L3}$ equal to the currents $I_{L1}$ and $I_{L2}$. Current $I_{L2}$ is equal to $-I_B$, and current $I_{L1}$ is equal to $I_C$. This arrangement provides an equal current in all lines L1, L2, and L3, irrespective of the absence of current flow in phase A. In addition, by providing the angle $c$ between the loaded phase currents at a value of 60°, the currents $I_{L1}$, $I_{L2}$ and $I_{L3}$ are displaced from each other approximately 120°. Consequently, the condition of a balanced three phase system is obtained.

It is appreciated that the decrease in the capacitive reactance of phase B can be utilized to increase the capacitive reactance in phase C. This allows efficient utilization of the capacitive reactance of the various induction heating stations 12, 14.

The basic aspect of the present invention is providing the angle $c$ with a value of approximately 60°. This will result in an equilateral triangle to obtain the resultant current $I_{L3}$. Other arrangements could be provided for obtaining the desired angle $c$. For instance, the angle $a$ could be zero with the angle $b$ being 60°. Also, the angle $a$ could be on the opposite side of voltage vector $V_C$. This could be accomplished by providing a lagging current $I_C$ through undercorrection of the power factor in phase C. When this happens, the angle $b$ would be greater than 60° by the amount of the displacement of current $I_C$ beyond voltage $V_C$. A variety of other such arrangements to provide the necessary angle of 60° between the currents $I_B$ and $I_C$ could be easily derived.

The present invention has been described in connection with certain physical embodiments and concepts; however, it is to be appreciated that these embodiments and concepts can be varied without departing from the intended spirit and scope of the present invention as defined in the appended claims.

I claim:

1. A method of balancing a three phase electrical system connected in delta and having successive phases A, B, and C, said system being used to energize two induction heating stations, each station including resistance, inductive reactance and capacitive reactance, one of said stations being connected across phase B, and the other of said stations being connected across phase C, and phase A being unloaded, said system including lead-in lines L1, L2, and L3 with L1 connected at the junction of phases C and A, L2 connected at the junction of phases A and B, and L3 connected at the junction of B and C whereby the current in L1 equals the vector sum of the currents in phases C and A, the current in L2 equals the vector sum of the currents in phases A and B and the current in L3 equals the vector sum of the currents in phases B and C, said method comprising the step of: adjusting the reactance in phases B and C so that the currents in theses phases are displaced from each other by approximately 60°.

2. The method as defined in claim 1 wherein said adjusting step comprises the steps of increasing the capacitive reactance in phase C and decreasing the capacitive reactance in phase B whereby said currents in phases B and C are displaced toward each other with their included angle being approximately 60°.

3. The method as defined in claim 2 wherein the increased capacitive reactance in phase C causes the current in phase C to lead by approximately 30°.

4. The method as defined in claim 1 wherein said adjusting step comprises the steps of changing the reactance in phase C an amount causing said current in phase C to lead approximately 30°.

References Cited

UNITED STATES PATENTS

| 3,193,605 | 7/1965 | Dreyfus | 13—12 |
| 3,331,909 | 7/1967 | Kasper | 13—27 |

FOREIGN PATENTS 882,047  11/1961  Great Britain.

JOHN F. COUCH, *Primary Examiner.*

W. E. RAY, *Examiner.*